United States Patent [19]

Morduchowitz

[11] 4,323,463
[45] Apr. 6, 1982

[54] SECONDARY RECOVERY PROCESS

[75] Inventor: Abraham Morduchowitz, Monsey, N.Y.

[73] Assignee: Texaco Inc., White Plains, N.Y.

[21] Appl. No.: 158,657

[22] Filed: Jun. 11, 1980

[51] Int. Cl.³ .............................................. E21B 43/22
[52] U.S. Cl. ................................. 252/8.55 D; 166/275; 526/307.5
[58] Field of Search .................. 252/8.55 D; 166/274, 166/275; 526/307.5

[56] References Cited

U.S. PATENT DOCUMENTS

| | | | |
|---|---|---|---|
| 2,808,397 | 10/1957 | Stroh et al. | 525/336 |
| 3,039,529 | 6/1962 | McKennon | 252/8.55 X |
| 3,684,014 | 8/1972 | Norton et al. | 252/8.55 X |
| 3,804,173 | 4/1974 | Jennings | 252/8.55 X |
| 3,880,765 | 4/1975 | Watson | 252/8.55 |
| 4,110,224 | 8/1978 | Allen | 166/275 X |

Primary Examiner—Herbert B. Guynn
Attorney, Agent, or Firm—Carl G. Ries; Robert A. Kulason; Walter D. Hunter

[57] ABSTRACT

Hydrocarbons are recovered from a subterranean hydrocarbon-bearing formation penetrated by an injection well and a production well by displacing hydrocarbons toward the production well using a drive fluid such as water thickened with a terpolymer of acrylamide, acrylonitrile and acrylic acid or a terpolymer of acrylamide, acrylonitrile and acrylic acid alkoxylated with ethylene oxide. If desired, the drive fluid may be saturated with carbon dioxide and/or natural gas at the injection pressure.

11 Claims, 1 Drawing Figure

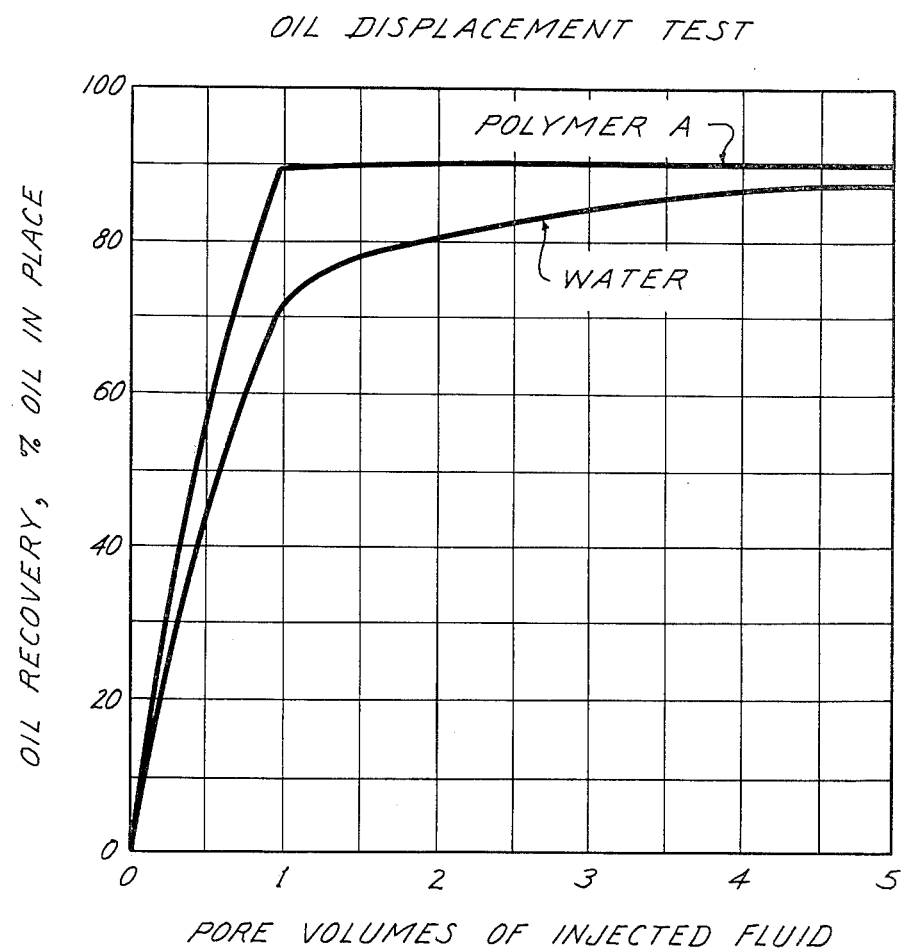

SECONDARY RECOVERY PROCESS

BACKGROUND OF THE INVENTION

1. Field of the Invention

This invention relates to a process for recovering hydrocarbons from a subterranean hydrocarbon-bearing formation penetrated by an injection well and a production well wherein a drive fluid such as water thickened with a terpolymer of acrylamide, acrylonitrile and acrylic acid or a terpolymer of acrylamide, acrylonitrile and acrylic acid alkoxylated with ethylene oxide or a mixture of ethylene oxide and propylene oxide, is utilized to displace hydrocarbons in the formation toward a production well.

2. Prior Art

The production of petroleum products is usually accomplished by drilling into a hydrocarbon-bearing formation and utilizing one of the well-known recovery methods for the recovery of hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave up to 70–80 percent of the original hydrocarbons in place.

Thus, many large reserves of petroleum fluids from which only small recoveries have been realized by present commercial recovery methods, are yet to reach a potential recovery approaching their estimated oil-in-place.

Water flooding is one of the more widely practiced secondary recovery methods. A successful water flood may result in recovery of 30–50 percent of the original hydrocarbons left in place. However, generally the application of water flooding to many crudes results in much lower recoveries.

The newer development in recovery methods for heavy crudes is the use of steam injection which has been applied in several modifications, including the "push-pull" technique and through-put methods, and has resulted in significant recoveries in some areas. Crude recovery of this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation, that is, the sorptive capacity of the sand for the crude is great. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency recovery. Another disadvantage is the tendency of the aqueous drive fluid to finger, since its viscosity is considerably less than that of the crude, thereby reducing the efficiency of the processes. Another disadvantage is the tendency of the aqueous drive fluid to remove additional gas by diffusion from the in-place oil thus further reducing the already lowered formation oil volume and increasing the viscosity of the oil.

There is a definite need in the art for a water flooding process in which the disadvantages discussed above are largely eliminated or avoided.

SUMMARY OF THE INVENTION

This invention relates to a process for recovering hydrocarbons from a subterranean, hydrocarbon-bearing formation penetrated by an injection well and a production well which comprises:

(a) injecting into the formation via an injection well a drive fluid comprising brine having dissolved therein a small amount of a terpolymer comprising recurring units of:

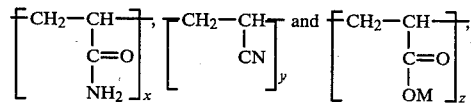

wherein x, y and z represent the weight percent of the respective units in the said terpolymer wherein M is selected from the group consisting of hydrogen, sodium, potassium, ammonium or the radical

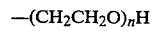

wherein n is an integer of from 1 to 3 inclusive, (b) forcing the said fluid through the formation and (c) recovering hydrocarbons through the production well.

An additional embodiment of this invention relates to the driving fluid compositions utilized in step (a) which may be saturated with carbon dioxide and/or natural gas at the injection pressure, if desired.

BRIEF DESCRIPTION OF THE DRAWINGS

The FIGURE illustrates the results obtained in capillary displacement tests utilizing water alone and employing an aqueous solution having 20,000 parts per million NaCl plus 0.025 weight percent of a brine-soluble acrylamide-acrylonitrile-sodium acrylate terpolymer.

DETAILED DESCRIPTION OF THE INVENTION

Prior to practicing the process of this invention it is sometimes desirable to open up a communication path through the formation by a hydraulic fracturing operation. Hydraulic fracturing is a well-known technique for establishing a communication path between an injection well and a production well. Fracturing is usually accomplished by forcing a liquid such as water, oil or any other suitable hydrocarbon fraction into the formation at pressures which are sufficient to rupture the formation and to open up channels therein. By use of this method it is possible to position the fracture at any desired vertical location with respect to the bottom of the oil-filled zone. It is not essential that the fracture planes be horizontally oriented, although it is, of course, preferably that they be. After the fracture has been established, and without diminishing the fracture pressure, a propping agent may be injected into the fraction in order to prevent healing of the fracture which would destroy its usefulness for fluid flow communication purposes. Gravel, metal shot, glass beads, sand, etc. and mixtures thereof are generally employed as propping agents. When sand is utilized as the propping agent particles having a Tyler mesh size of from about 8 to about 40 are preferred (i.e., from about 0.16 to about 0.093 inches).

As previously pointed out the terpolymers employed in this invention comprise recurring units of:

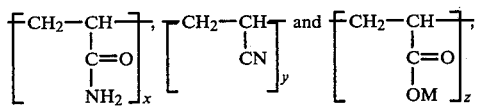

wherein x, y and z represent the weight percent of the respective units and wherein the sum of x, y and z is 100, wherein M is selected from the group consisting of hydrogen, sodium, potassium, ammonium or the radical $$-(CH_2CH_2O)_nH$$

wherein n is an integer of from 1 to 3 inclusive. In the terpolymers employed in this invention x will vary from about 50 to about 60 weight percent, y will vary from about 20 to about 30 weight percent and z will range from about 10 to about 20 weight percent. Generally, the number average molecular weight of the terpolymers will range from about 10,000 to about 2,000,000 or more. The terpolymers of this invention are insoluble in water but are soluble in brine having a total salt concentration of about $2 \times 10^3$ ppm to about $2 \times 10^5$ ppm.

Terpolymers of acrylamide, acrylonitrile and acrylic acid or the sodium, potassium or ammonium salts thereof which are water soluble are known and the preparation of such terpolymers is described in the U.S. Pat. No. 3,039,529. In this same patent the use of the water soluble terpolymers in a secondary recovery process for petroleum is disclosed.

Surprisingly it has been found that the terpolymers of this invention as described above although not soluble in water are soluble in brine and are therefore highly useful in drive fluids where brine is utilized as the aqueous fluid.

The brine-soluble terpolymers of this invention can be prepared by a number of vinyl polymerization routes which are well known in the art. These terpolymers can also be conveniently prepared by the process set out in the U.S. Pat. No. 3,039,529 which is incorporated herein in its entirety.

Where one of the components of the brine-soluble terpolymers of this process is alkoxylated acrylic acid such alkoxylated monomers can be conveniently prepared by methods well known in the art. For example, an aqueous solution of acrylic acid comprising about 10 to about 30 weight percent or more of the acid in water along with about 0.5 weight percent or more of powdered potassium hydroxide or sodium hydroxide is charged to an autoclave and the autoclave and contents heated to a temperature of about 125° to about 200° C. after which the required weight of ethylene oxide or a mixture of ethylene oxide and propylene oxide is pressured with nitrogen into the autoclave over a period of 1 to about 3 hours or more following which the autoclave is allowed to cool to room temperature and then vented. The reaction product remaining after being stripped to remove volatile materials yields the water-soluble, alkoxylated acrylic acid product. Alternatively, the alkoxylated acrylic acid component can be formed by reacting a polyoxyalkylene glycol of suitable molecular weight with acrylic acid in the presence of, for example, potassium hydroxide.

A number of other methods are set out in the art for conducting such alkoxylation reactions including those described in U.S. Pat. Nos. 2,213,477, 2,233,381; 2,313,142; 3,879,475; 2,174,761; 2,425,845 and 3,062,747.

The following example illustrates the preparation of the brine-soluble acrylamide-acrylic acid-acrylonitrile terpolymers useful in this invention.

| Preparation of Polymer A | | | |
|---|---|---|---|
| Materials: | (1) | Acrylamide | 60 gm. |
| | (2) | Acrylonitrile | 20 gm. |
| | (3) | Acrylic Acid | 20 gm. |
| | (4) | Sodium Chloride | 25 gm. |
| | (5) | Potassium Persulfate | 0.08 gm. |
| | (6) | Ethylene Diaminetetraacetic Acid Disodium Salt (EDTAA) | 0.05 gm. |
| | (7) | Sodium Carbonate | 30 gm. |
| | (8) | Distilled Water | 500 ml. |

A 1 liter resin kettle was charged with the above monomers, sodium chloride, sodium carbonate and EDTAA, dissolved in distilled water and purged with pre-purified nitrogen while heating to 53° C. When the temperature reached 53° C. (after 30 minutes), the potassium persulfate initiator was added and the polymerization reaction was allowed to proceed over a period of 6 hours. The resultant viscous rubbery mass was broken up into small chunks, dropped into 1500 ml. of methanol and the mixture stirred for 1 hour. The solid polymer was then placed in a Waring Blender with some methanol and ground into small granules, filtered on a Buchner funnel and dried in a vacuum oven to constant weight at 60° C. (∠1 mm) to yield 130.8 gm. of recovered polymeric product (Polymer A).

Polymer A was evaluated and the test results are reported below:

| | Polymer A[a] | Polymer B[b] |
|---|---|---|
| Viscosity at 300 ppm in H$_2$O | Insoluble | 7.36 |
| Screen Viscometer Factor* | Insoluble | 8.0 |
| Viscosity at 300 ppm in 2% NaCl | 1.32 | 1.36 |
| Screen Viscometer Factor | 6.0 | 6.0 |
| % Polymer Loss in 24 Hr. Adsorption (Pump Test in Berea Sandstone Core) | 16% | 19% |

[a]Polymer composed of acrylamide/acrylonitrile/sodium acrylate in 50/20/25 wt. ratio was insoluble in both distilled water and 2% NaCl whereas Polymer A having a 60/20/20 wt. ratio is soluble in brine and insoluble in water.
[b]Polymer B is a commercially available partially hydrolyzed polyacrylamide sold under the tradename "Pusher 700" by the Dow Chemical Company.

*Screen Viscometer Factor = $\dfrac{\text{Time in Seconds for 30 ml. Polymer Solution to Flow Through } 5 \times 100 \text{ Mesh Screens of } \frac{1}{4}\text{" Diameter}}{\text{Time in Seconds for 30 ml. Distilled Water or 2% NaCl Solution to Flow Through } 5 \times 100 \text{ Mesh Screens of } \frac{1}{4}\text{" Diameter}}$ In order to study the displacement performance of a brine solution of Polymer A (Polymer concentration—0.025 weight percent), laboratory displacement tests were conducted on a radial core obtained from a Berea sand field. The core which was approximately 4 inches in outside diameter had an inside bore diameter of 0.5 inches and was approximately 4 inches long. The permeability of the core was about 12,480 millidarcies. A similar test was conducted to determine the response to a conventional water flood conducted to breakthrough of the injected water in order to obtain a comparison of the results realized using polymer thickened brine and water alone. In each test the clean, evacuated radial core was filled with simulated connate water which was then displaced by stock tank oil to establish initial oil saturation. Both floods were performed at the same constant displacement rate, and the results obtained are given in the FIGURE. It can be seen that the maximum recovery which occured at one pore volume of injected fluid using a conventional water flood was in the range of 75 percent, whereas approximately 90 percent recovery was achieved utilizing the terpolymer composition of this invention in brine having an NaCl concentration of 20,000 ppm.

In the secondary recovery process of this invention, generally the aqueous drive fluid will contain from about 0.01 to about 5.0 weight percent or more of the brine-soluble, acrylamide-acrylonitrile-acrylic acid or alkoxylated acrylic acid terpolymer. Optionally, the aqueous drive fluid may be saturated with carbon dioxide and/or natural gas at the injection pressure which generally will be from about 300 to about 3000 psig or more.

If desired, the aqueous drive fluid having dissolved therein the above-described polymeric thickening agent may be made alkaline by addition of an alkaline agent. The advantageous results achieved with the aqueous alkaline medium used in the process of this invention are believed to be derived from the wettability improving characteristics of the alkaline agent.

Useful alkaline agents include compounds selected from the group consisting of alkali metal hydroxides, alkaline earth metal hydroxides, and the basic salts of the alkali metal or alkaline earth metals which are capable of hydrolyzing in an aqueous medium to give an alkaline solution. The concentration of the alkaline agent employed in the drive fluid is generally from about 0.005 to about 0.3 weight percent. Also, alkaline materials such as sodium hypochlorite are highly effective as alkaline agents. Examples of these especially useful alkaline agents include sodium hydroxide, potassium hydroxide, lithium hydroxide, ammonium hydroxide, sodium hypochlorite, potassium hypochlorite, sodium carbonate and potassium carbonate.

A wide variety of surfactants such as linear alkylaryl sulfonates, alkyl polyethoxylated sulfates, etc. may also be included as a part of the aqueous drive fluid composition. Generally about 0.001 to about 1.0 or more weight percent of the surfactant will be included in the drive fluid.

This invention is best understood by reference to the following example which is offered only as an illustrative embodiment of this invention and is not intended to be limitative.

EXAMPLE I

In a field in which the primary production has already been exhausted, an injection well is completed in the hydrocarbon-bearing formation and perforations are formed between the interval of 5680–5695 feet. A production well is drilled approximately 440 feet distance from the injection well, and perforations are similarly made in the same hydrocarbon-bearing formation at 5685–6000 feet.

The hydrocarbon-bearing formation in both the injection well and the production well is hydraulically fractured using conventional techniques, and a gravel-sand mixture is injected into the fracture to hold it open and prevent healing of the fracture.

In the next step brine saturated with carbon dioxide at 1200 psig at a temperature of 70° F. to which there has been added about 0.10 weight percent sodium hydroxide and containing dissolved therein 0.40 weight percent of an acrylamide-acrylonitrile-sodium acrylate terpolymer having a number average molecular weight of about 125,000 is injected via the injection well into the formation at a pressure of 1200 psig and at the rate of 0.95 barrel per minute. In the acrylamide-acrylonitrile-sodium acrylate terpolymer the weight percent of the acrylamide units is about 58, the weight percent of the acrylonitrile units is 24 with the balance being sodium acrylate units. Injection of the drive fluid is continued at the rate of about 1 barrel per minute and at the end of 65 days the rate of production of oil is substantially greater than with water injection alone.

What is claimed is:

1. A process for recovering hydrocarbons from a subterranean, hydrocarbon-bearing formation penetrated by an injection well and a production well which comprises:

(a) injecting into the formation via an injection well a drive fluid comprising brine having dissolved therein about 0.01 to about 5.0 weight percent of a terpolymer water insoluble, brine soluble, having a number average molecular weight from about 10,000 to about 2,000,000 and comprising recurring units of:

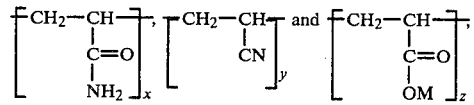

wherein x, y and z represent the weight percent of the respective units in the said terpolymer and x ranges from about 50 to about 60 weight percent, y ranges from about 20 to about 30 weight percent and z ranges from about 10 to about 20 weight percent and wherein M is the radical

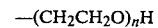

wherein n is an integer of from 1 to 3 inclusive
(b) forcing the said fluid through the formation and
(c) recovering hydrocarbons through the production well.

2. The process of claim 1 wherein the said drive fluid is saturated with carbon dioxide at a pressure of about 300 to about 3000 psig.

3. The process of claim 1 wherein the said drive fluid is saturated with natural gas at a pressure of about 300 to about 3000 psig.

4. The process of claim 1 wherein the said drive fluid includes about 0.005 to 0.3 weight percent of an alkaline agent selected from the group consisting of sodium hdyroxide, potassium hydroxide and sodium hypochlorite.

5. The process of claim 1 wherein said drive fluid contains about 0.001 to about 1.0 weight percent of a surfactant.

6. The process of claim 1 wherein said drive fluid contains about 0.001 to about 1.0 weight percent of a surfactant selected from the group consisting of alkylaryl sulfonates and alkyl polyethoxylated sulfates.

7. The process of claim 1 wherein the total salt concentration of said brine containing drive fluid is from about 2,000 ppm to about 20,000 ppm.

8. A fluid comprising brine having dissolved therein about 0.01 to about 5.0 weight percent of a terpolymer water insoluble, brine soluble, having a number average molecular weight from about 10,000 to about 2,000,000, and comprising recurring units of:

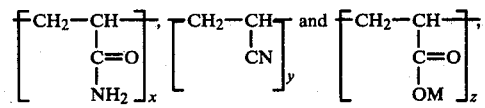

wherein x, y and z represent the weight percent of the respective units in the said terpolymer and x ranges from about 50 to about 60 weight percent, y ranges from about 20 to about 30 weight percent and z ranges from about 10 to about 20 weight percent and wherein M is the radical $$-(CH_2CH_2O)_nH,$$

wherein n is an integer of from 1 to 3 inclusive.

9. The fluid of claim 8 wherein about 0.005 to about 0.3 weight percent of an alkaline agent selected from the group consisting of sodium hydroxide, potassium hydroxide and sodium hypochlorite is included.

10. The fluid of claim 8 wherein about 0.001 to about 1.0 weight percent of a surfactant selected from the group consisting of alkylaryl sulfonates and alkyl polyethoxylated sulfates is included.

11. The fluid of claim 8 wherein the total salt concentration is about 2,000 ppm to about 20,000 ppm.

* * * * *